(12) United States Patent
Harter

(10) Patent No.: US 11,376,945 B2
(45) Date of Patent: Jul. 5, 2022

(54) AIR INLET DEVICE FOR AN ELECTRIC VEHICLE

(71) Applicant: Dr. Ing. h.c.F. Porsche Aktiengesellschaft, Stuttgart (DE)

(72) Inventor: Sebastian Harter, Leonberg (DE)

(73) Assignee: Dr. Ing. h.c. F. Porsche Aktiengesellschaft, Stuttgart (DE)

(*) Notice: Subject to any disclaimer, the term of this patent is extended or adjusted under 35 U.S.C. 154(b) by 85 days.

(21) Appl. No.: 16/784,271

(22) Filed: Feb. 7, 2020

(65) Prior Publication Data
US 2020/0254867 A1 Aug. 13, 2020

(30) Foreign Application Priority Data
Feb. 12, 2019 (DE) ............ 10 2019 103 458.2

(51) Int. Cl.
| | | |
|---|---|---|
| *B60K 11/00* | (2006.01) | |
| *B60K 11/06* | (2006.01) | |
| *B60K 11/08* | (2006.01) | |

(52) U.S. Cl.
CPC ............ *B60K 11/06* (2013.01); *B60K 11/085* (2013.01)

(58) Field of Classification Search
CPC ........ B60K 11/04; B60K 11/06; B60K 11/085
See application file for complete search history.

(56) References Cited

U.S. PATENT DOCUMENTS

| | | | | |
|---|---|---|---|---|
| 8,091,516 B2* | 1/2012 | Preiss | ................... | B60K 11/04 |
| | | | | 123/41.05 |
| 8,667,931 B2* | 3/2014 | Kerns | ...................... | F01P 7/10 |
| | | | | 123/41.05 |
| 8,708,075 B2* | 4/2014 | Maurer | .................. | B60R 19/52 |
| | | | | 180/68.1 |
| 8,794,363 B2* | 8/2014 | Wolf | .................... | B60K 11/085 |
| | | | | 180/68.1 |
| 9,216,644 B2* | 12/2015 | Cardile | ............... | B60K 11/085 |
| 9,855,981 B1* | 1/2018 | Dunford | ............. | B60K 11/085 |
| 10,421,505 B2* | 9/2019 | Tjoelker | ................ | B62D 37/02 |
| 10,563,564 B2* | 2/2020 | Schwartz | ................ | F01P 7/048 |
| 10,953,741 B2* | 3/2021 | Temple | ................ | B60K 11/085 |
| 2011/0005851 A1* | 1/2011 | Doroghazi | .......... | B60R 13/0838 |
| | | | | 180/68.1 |
| 2012/0060776 A1* | 3/2012 | Charnesky | ........... | B60K 11/085 |
| | | | | 123/41.05 |
| 2012/0323448 A1* | 12/2012 | Charnesky | ........... | B60K 11/085 |
| | | | | 701/49 |
| 2016/0016617 A1* | 1/2016 | Wolf | .................... | B60K 11/085 |
| | | | | 296/208 |
| 2017/0144533 A1* | 5/2017 | Gilotte | ................. | B62D 25/085 |
| 2017/0144710 A1* | 5/2017 | Frayer | ..................... | H01Q 1/42 |

FOREIGN PATENT DOCUMENTS

| | | |
|---|---|---|
| DE | 102011111265 A1 | 5/2012 |
| DE | 102018101357 A1 | 7/2018 |

\* cited by examiner

*Primary Examiner* — Hau V Phan
(74) *Attorney, Agent, or Firm* — Leydig, Voit & Mayer, Ltd.

(57) ABSTRACT

An air inlet device is provided for an electric vehicle, which includes a cladding portion for guiding an air flow around the electric vehicle. The cladding portion has a visible first inlet opening for letting in a first fraction of the air flow and a concealed second inlet opening for letting in a second fraction of the air flow.

15 Claims, 4 Drawing Sheets

AIR INLET DEVICE FOR AN ELECTRIC VEHICLE

CROSS-REFERENCE TO PRIOR APPLICATIONS

Priority is claimed to German Patent Application No. DE 10 2019 103 458.2, filed on Feb. 12, 2019, the entire disclosure of which is hereby incorporated by reference herein.

FIELD

The present invention relates to an air inlet device for an electric vehicle, to an electric vehicle with such an air inlet device and to a method for controlling such an air inlet device.

BACKGROUND

Vehicles have air inlet devices in order to receive the required air supply for the operation of the vehicle. What is concerned here, is that air needed for a ventilation device of the interior of the vehicle. Such air inlet devices are also used in order to make air available in combustion engines for the cooling or the combustion of the combustion engine.

A disadvantage with known solutions is that, particularly in vehicles with combustion engines in the sports car sector, very large inlet openings are necessary to let the required cooling volumes and combustion volumes of air into the engine compartment. In the case of sports vehicles, this was also desired hitherto since this equated to the corresponding visual characteristics of sports cars. However, in the case of new vehicles, in particular in electric vehicles, it is desired to achieve a visual distinction over the already known combustion engines. However, electric vehicles are also equipped with an air requirement which serves, for example, for the cooling or temperature control of a battery device, but also for supplying air into the interior of the vehicle. This results in design terms in a conflict of goals, namely on the one hand making available no or the smallest possible inlet opening cross sections for the air inlet device and at the same time forming the largest possible inlet opening cross sections for the air requirement needed. This was solved hitherto by a compromise, with the result that it was attempted to reduce the maximum size of the inlet opening through the maximum necessary air requirement. However, this is possible only to a limited degree and has corresponding effects on the further technical features and designs for the ventilation of the interior and the temperature control of the battery device.

SUMMARY

An embodiment of the present invention provides an air inlet device for an electric vehicle, the air inlet device comprising a cladding portion for guiding an air flow around the electric vehicle. The cladding portion and has a visible first inlet opening for letting in a first fraction of the air flow and a concealed second inlet opening for letting in a second fraction of the air flow.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
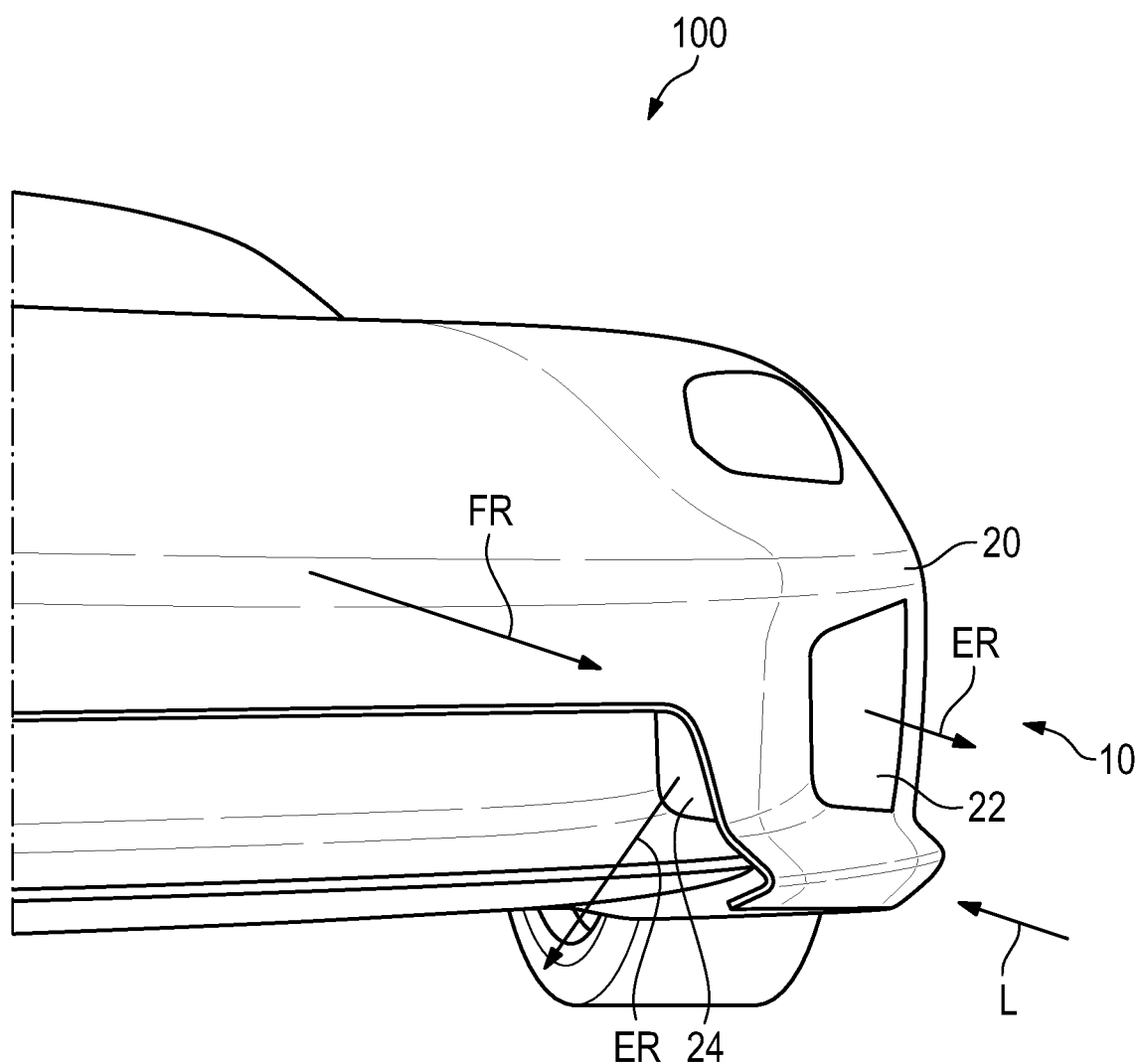
FIG. 1 shows an embodiment of an electric vehicle according to the invention in the front section.

Embodiments of the present invention at least partially overcome the disadvantages described above. For example, embodiments of the present invention improve the air inlet in an electric vehicle in a cost-effective and simple manner, e.g., to be able to ensure a visual distinguishability over vehicles having a combustion engine.

The improvements are achieved by features of several embodiments of the present invention, including embodiments of an air inlet device, an electric vehicle having the air inlet device, and a method for controlling the air inlet device. Further features and details of the present invention will emerge from the description and the drawings. Here, features and details which are described in conjunction with the air inlet device according to the present invention self-evidently also apply in conjunction with the electric vehicle according to the present invention and the method according to the present invention (and vice versa in each case); and therefore, reference is or can be made constantly from one to the other in respect of the disclosure of the individual aspects of the present invention.

An air inlet device according to an embodiment of the present invention for an electric vehicle has a cladding portion for guiding an air flow around the electric vehicle. This cladding portion is equipped with a first visible inlet opening for letting in a first fraction of the air flow. Furthermore, this cladding portion has a second concealed inlet opening for letting in a second fraction of the air flow.

The air inlet device is arranged in a cladding portion of the electric vehicle. What is to be understood here by a cladding portion is the outer skin or outer shell of the vehicle along which the air flow flows during movement of the electric vehicle. The cladding portion is preferably a region of the vehicle that is impinged longitudinally or transversely by the air flow, that is to say, in particular a part of the front section of the electric vehicle or a laterally arranged cladding portion of the electric vehicle.

By contrast to the known solutions which are used in combustion vehicles but also in electric vehicles, the air inlet is based not on a single inlet opening, but on at least two inlet openings. It should be distinguished here that these two inlet openings are formed in a common cladding portion. This is to be distinguished in particular from an entire vehicle front section in which in particular symmetrically corresponding inlet openings are arranged on two different sides. By contrast to this solution, in the embodiment according to the invention there is made available, in a single cladding portion, that is to say for example on the one left side of the front section of the vehicle, a cladding portion with two different inlet openings. As will be discussed later with reference to an electric vehicle according to the present invention, a symmetrical arrangement of such cladding portions, and hence a symmetrical arrangement of such air inlet devices, can of course also be provided. In the front section, this would lead to the fact that, given two symmetrical cladding portions on the left and on the right, in each case a cladding portion with in each case two inlet openings would be formed.

An aspect of embodiments of the present invention can be seen in that the inlet of the air flow is now split into two different inlet openings. These two inlet openings are distinguished to the effect that the first inlet opening is arranged and oriented visibly and the second inlet opening is arranged and oriented in a concealed manner. What is to be understood here by a visible inlet opening is an orientation or formation and arrangement on the cladding portion that is clearly viewable from the outside of the vehicle. The viewability relates here to other road users, such as, for example, other vehicle drivers, pedestrians or cyclists. In the same manner, the second inlet opening is also defined as a concealed second inlet opening. Other road users have a poor view or even no view into this inlet opening. A concealed inlet opening may be discernible here in principle, but only with increased difficulty or increased effort. For example, the second inlet opening can have a different orientation, with the result that, only by a pedestrian bending down or kneeling down, is it possible for this second concealed inlet opening to be discerned.

In spite of the formation as a concealed second inlet opening, it is, however, designed as an inlet opening for air flow. This means that, during operation of the electric vehicle, in each case a fraction of the air flow can of course penetrate not only through the visible first inlet opening but also through the concealed second inlet opening.

In view of features of the present invention, it is now possible to substantially freely apportion the particular opening cross sections with which the two inlet openings are equipped. This particularly allows the visible first inlet opening to be equipped with a definedly smaller inlet cross section than is the case in combustion engines. There can clearly be seen here the design freedom which results from the fact that the possibly greater air requirement needed can now be achieved in total by the concealed second inlet opening. If the visible first inlet opening is thus intended to be formed ever smaller, in particular from visual points of view, to distinguish from combustion vehicles, then the correspondingly larger design of the inlet cross section of the concealed second inlet opening can compensate for this reduced air inlet. The sum of the inlet cross sections of the two inlet openings therefore gives the sum of the fraction of the air flow that has entered.

As is evident from the above explanation, it can now be possible for visual requirements placed on distinguishability from combustion vehicles to be harmonized with a likewise high air requirement of an electric vehicle. This is based on the distinction between the two separate inlet openings, which are in particular spaced apart from one another and are formed especially with different visibility. It should also be pointed out here that a concealed inlet opening can of course also be understood to mean further optical measures in order to reduce the visibility of this second inlet opening. Apart from the arrangement and orientation at a concealed position, optical means, such as, for example, a dark design, an offsetting into a rearward opening or a black configuration in the inner region of this inlet opening, can also reduce the visibility particularly by comparison with the opposite configuration of the first inlet opening.

Advantages can be afforded if, in an air inlet device according to the present invention, the concealed second inlet opening has a smaller opening cross section than the visible first inlet opening. Consequently, the first inlet opening forms as it were the main inlet opening, which can be supplemented by the concealed second inlet opening. This is particularly expedient when the closure device, which will be explained later in more detail, is intended to be used. The correlation between different opening cross sections between the two different inlet openings reveals the design freedom achieved according to the invention in a particularly clear manner.

Moreover, it can be advantageous if, in an air inlet device according to the invention, the concealed second inlet opening has an inlet direction which forms an acute angle with the direction of travel of the electric vehicle and is oriented inwardly and/or downwardly. This is a preferred design of the second inlet opening in order to achieve the concealed arrangement. The direction of travel of the vehicle is defined by the cladding part in its mounted position and is in particular directed counter to the orientation of the air flow during operation of the electric vehicle. If the second inlet opening now has its inlet direction correlated at an acute angle with the direction of travel and is oriented inwardly and/or downwardly, this automatically leads to a possibility of a concealed and non-readily viewable arrangement of this second inlet opening. This is based on the fact that the cladding portions on the vehicle, in particular in the front section of the vehicle, are arranged relatively far down on the electric vehicle, that is to say close to the ground. Other traffic users, such as, for example, passers-by, cyclists, motorcycle riders or other vehicle drivers, are positioned considerably higher in terms of their field of view. This thus means that the orientation according to this embodiment represents an orientation of the second inlet opening away from the field of view of the other road users. This orientation alone therefore allows a possibility to be made available in order to ensure a concealed arrangement and configuration of this second inlet opening.

Advantages are further afforded if, in an air inlet device according to the invention, the cladding portion has a closure device with at least one closure flap for the closure and controlled opening of the first inlet opening and/or the second inlet opening. It is possible, in an embodiment according to the invention of the air inlet device, to ensure controllability of the air inlet device by means of the closure device. There are thus operating situations of an electric vehicle in which a considerably lower air requirement is present. If, for example, no temperature control, in particular no cooling, of the battery device of the electric vehicle is necessary, a considerably lower air requirement for the temperature-control device is also present. This in turn allows the drag coefficient, that is to say the air resistance coefficient, of the vehicle to be considerably improved if the reduced air requirement is associated with a reduced air inlet. The closure device is now capable by way of the at least one closure flap of at least partially closing at least one of the inlet openings. In particular, this closure takes place completely. The closure device can consequently be capable of switching the air inlet device between different amounts of air requirement. This is preferably combined with a configuration with different opening cross sections such that the closure flap particularly closes the inlet opening which has the smaller opening cross section.

Further advantages are afforded if, in an air inlet device according to the invention, the closure device has, for the first inlet opening, at least one first closure flap and, for the second inlet opening, at least one second closure flap. Therefore, the closure devices are thus capable of variably closing all the inlet openings. Two or more closure flaps can of course also be provided for each inlet opening in order in particular to be able to predetermine different degrees of opening for the individual inlet openings with quantitative controllability.

It can also be advantageous if, in an air inlet device according to the present invention, the closure device has a common movement mechanism for all closure flaps. This common movement mechanism makes it possible not only to specifically switch one closure flap but rather, with a single mechanical coupling, to control the two inlet openings and in particular all closure flaps in terms of their opening operation and/or in terms of their closing operation. The combination in a common movement mechanism allows a considerable reduction in the required weight and in the complexity for controlling the closure device.

There can be a further advantage if, in an air inlet device according to the invention, the movement mechanism determines a mechanical opening order for the closure flaps. A mechanical opening order is conceivable, for example, by means of corresponding lever ratios or corresponding freewheel mechanisms or clearances in the form of slots. Thus, during the movement by means of the movement mechanism, a movement of the closure flaps relative to one another can now take place sequentially, in parallel and/or partly in parallel. In particular, a closure flap of the second inlet opening is opened first of all, for example by activation with a control disk of a drive, before a movement of the at least one closure flap of the first inlet opening then takes place sequentially in succession with a further movement of the movement mechanism. This allows the inlet openings, in this case thus at first the second inlet opening and then the first inlet opening, to be opened sequentially one after the other and to be closed again in the reverse order.

Further advantages can be afforded if, in an air inlet device according to the present invention, at least one of the closure flaps can be moved by the movement mechanism into different opening positions. Whereas the fundamental controllability can already be formed by virtue of the fact that the respective closure flap is mounted so as to be movable between a closed position and an open position, a quantitative control within the meaning of the present invention is also conceivable. Thus, for example, different degrees of opening or different numbers of opened closure flaps can lead to quantitatively different air inlets. For situations as have been described for different air requirements of the electric vehicle, the particular reduction in the air resistance which is admissible and the particular opening cross section requirement which is needed during the current air requirement of the electric vehicle can thus be adapted in a considerably more variable and flexible manner.

The present invention also relates to an electric vehicle with at least two air inlet devices according to the present invention, which are arranged on different sides of the electric vehicle, in particular symmetrically to one another. An electric vehicle according to the present invention thus affords the same advantages as have been explained in detail with regard to an air inlet device according to the invention.

The present invention further relates to a method for controlling an air inlet device according to the invention, including the following steps: detecting an air requirement of the electric vehicle, and varying a closure device of the air inlet device on the basis of the detected air requirement.

A method according to the present invention thus affords the same advantages as have been explained in detail with regard to an air inlet device according to the present invention. In particular, it is possible in this way to control the inlet of the air quantity from the air flow not only qualitatively but even quantitatively to suit the requirements.

Further advantages, features and details of the invention will emerge from the description below in which exemplary embodiments of the invention are described in detail with reference to the drawings. Here, the features mentioned in the claims and in the description may be included in the invention in each case individually by themselves or in any desired combination.

FIG. 1 schematically shows a front section of an electric vehicle 100 according to an embodiment of the present invention. A cladding portion 20 of an air inlet device 10 according to the present invention is illustrated in this front section below the left front headlight and in front of the left front wheel. This air inlet device 10 extends in the direction of the air flow L which flows toward it and which, in particular during operation, that is to say during the travel of the electric vehicle 100, flows around the cladding portion 20. In order to guide at least a fraction of this air flow L into the interior of the vehicle during operation along the direction of travel FR, the air inlet device 10 is here equipped with a visible first inlet opening 22 and a concealed second inlet opening 24. The visible first inlet opening 22 has an inlet direction ER which can be oriented, for example, along the direction of travel FR and counter to the air flow L. At the same time, clear viewability is evident here, and therefore this first inlet opening 22 is a visible first inlet opening 22.

In FIG. 1, moreover, the second inlet opening 24 is provided with an inlet direction ER which is different from the first inlet opening 22. It forms an acute angle with the direction of travel FR and is here oriented inwardly and downwardly. This arrangement oriented inwardly or downwardly with respect to the direction of travel FR allows a view into this second inlet opening 24 to be hampered, and therefore what is concerned here is the concealed second inlet opening 24. Moreover, the second inlet opening 24 here is arranged in a set-back region in the front section of the vehicle and hence in the cladding portion 20. This setting-back of the inlet opening 24 also hampers the viewability and leads to the concealed arrangement of the second inlet opening 24.

Figure 2:
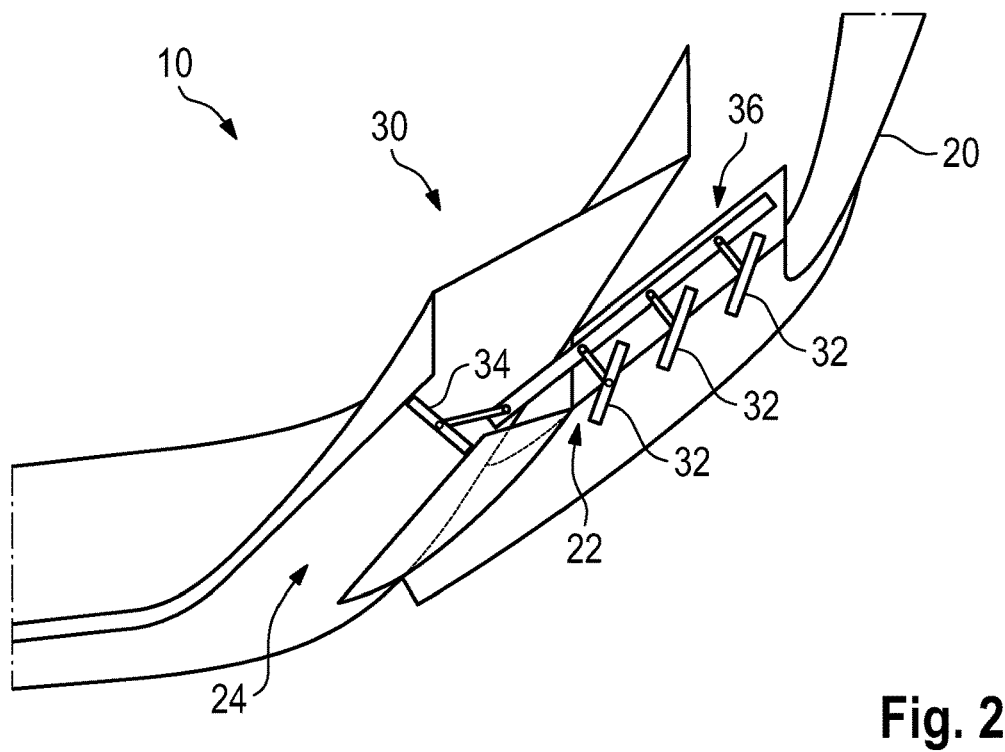
FIG. 2 shows a plan view of an air inlet device of the embodiment of FIG. 1.

FIGS. 2 to 5 show a variant with a closure device 30. These figures are in particular the plan view or a cross section in plan view of the embodiment of FIG. 1. As is clearly evident, the two inlet openings 22 and 24 are here likewise formed and oriented separately from one another. The first inlet opening 22 is viewable and visible here, whereas the second inlet opening 24 is formed and oriented in a concealed manner. In order to be able to vary the drag coefficient or the air resistance during operation of the vehicle, it is possible, with a reduced air requirement of the electric vehicle 100, for the air inlet device 10 to be switched into a closed position by means of the closure device. It is illustrated in FIG. 2 how the second inlet opening 24 is closed by a corresponding second closure flap 34. Three further first closure flaps 32 have assumed an open position in which the first inlet opening 22 is opened. A movement into the illustrated position of FIG. 2 can occur by means of a movement mechanism 36.

Figure 3:
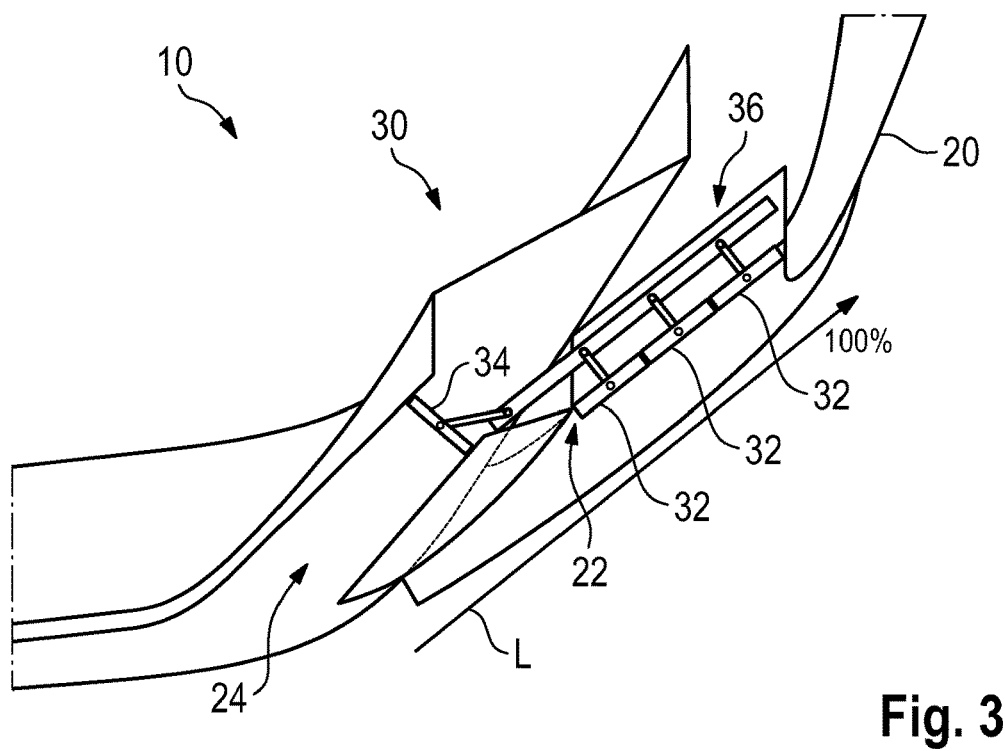
FIG. 3 shows the embodiment of FIG. 2 in a closed state of a closure device.
Figure 4:
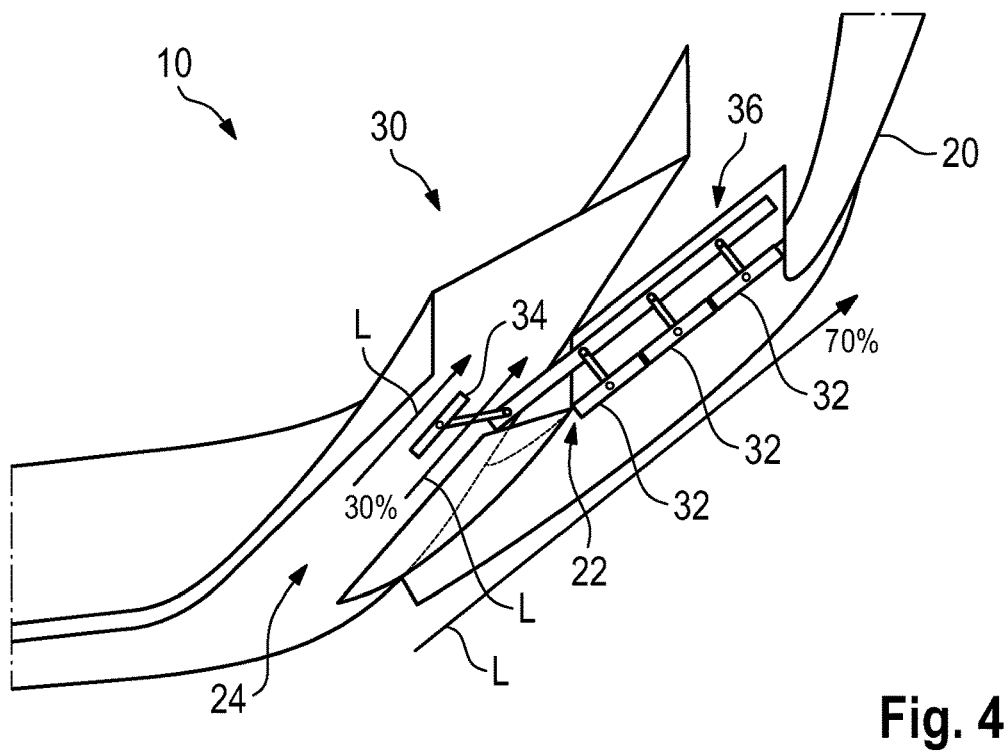
FIG. 4 shows the embodiments of FIGS. 2 and 3 in a first open state of the closure device.
Figure 5:
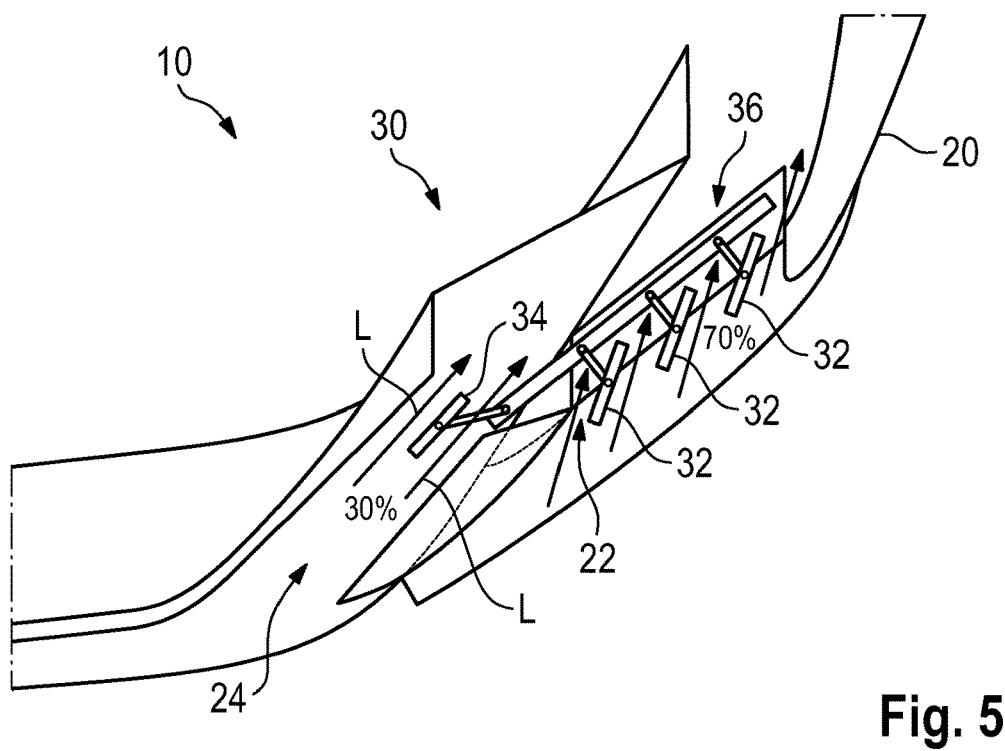
FIG. 5 shows the embodiments of FIGS. 2 to 4 in a further open state of a closure device.

FIGS. 3 to 5 here show a quantitative control possibility. If a particularly low air requirement is desired in the electric vehicle 100, all closure flaps 32 and 34 can be set into the closure position as shown in FIG. 3. In this situation, 100% of the air flow L goes past the air inlet device 10. If the air requirement of the electric vehicle 100 increases, in a first step as shown in FIG. 4 the second inlet flap 34 can be opened by the movement mechanism 36. In this example of FIG. 4, about 30% of the air flow now enters through the second inlet opening 24 into the air inlet device 10. A further 70% of the air flow L flows further past the cladding portion 20. If the movement mechanism 30 is now moved further, an opening of the first closure flaps 32 will also occur through the common formation of a sequential mechanical opening order. As a result, a position as shown in FIG. 5 is achieved in which now virtually all of the remaining 70% of the air flow L can likewise enter into the air inlet device 10 through the first inlet opening 22.

Figure 6:
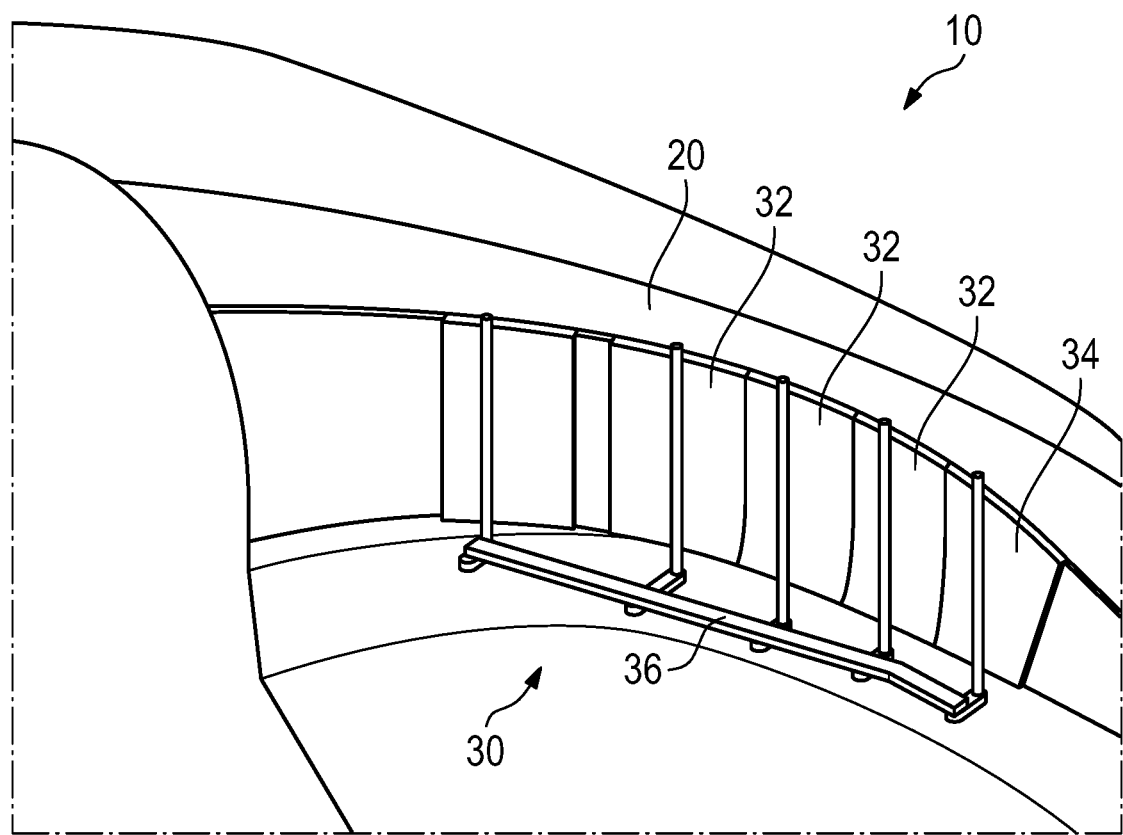
FIG. 6 shows an internal illustration of the embodiment of FIGS. 2 to 5.

FIG. 6 shows an embodiment of FIGS. 2 to 5 in an internal illustration. There is illustrated here a plurality of closure flaps 32 and 34 which are connected to one another via a common lever of a common movement mechanism 36. In order to ensure a mechanical sequential opening order, parts of the connections between the movement mechanism 36 and in particular the first closure flaps 32 are provided here with slots, thereby forming a freewheeling mechanism which, as the movement of the movement mechanism 36 progresses, leaves the first closure flaps unmoved for the first part of the movement.

The above explanation of the embodiments describes the present invention within the scope of examples. Individual features of the embodiments may of course be freely combined with one another, if technically feasible, without departing from the scope of the present invention.

While the present invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An air inlet device for an electric vehicle, the air inlet device comprising:
    a cladding portion for guiding an air flow around the electric vehicle, the cladding portion being a portion of an outer skin or outer shell of the electric vehicle along which the air flow is configured to flow during movement of the electric vehicle, wherein the cladding portion has:
        a visible first inlet opening configured to let in a first fraction of the air flow into an interior of the vehicle; and
        a concealed second inlet opening configured to let in a second fraction of the air flow into the interior of the vehicle, and
    wherein the visible first inlet opening is at a visible part of the cladding portion which is at a foremost surface of the electric vehicle in a forward direction of travel, and the concealed second inlet opening is at an obscured surface of the electric vehicle having at least another portion of the outer skin or outer shell arranged at least partially in front thereof at the foremost surface of the electric vehicle.

2. The air inlet device as claimed in claim 1, wherein the concealed second inlet opening has a smaller opening cross section than the visible first inlet opening.

3. The air inlet device as claimed in claim 1, wherein the concealed second inlet opening has an inlet direction that forms an acute angle with a direction of travel of the electric vehicle and is oriented inwardly and/or downwardly.

4. The air inlet device as claimed in claim 1, wherein the cladding portion has a closure device with at least one closure flap configured to provide closure and controlled opening of the visible first inlet opening and/or the second inlet opening.

5. The air inlet device as claimed in claim 4, wherein the closure device has, for the visible first inlet opening, at least one first closure flap and, for the concealed second inlet opening, at least one second closure flap.

6. The air inlet device as claimed in claim 4, wherein the closure device has a common movement mechanism for all closure flaps, which include the at least one closure flap.

7. The air inlet device as claimed in claim 6, wherein the common movement mechanism determines a mechanical opening sequence for the closure flaps.

8. The air inlet device as claimed in claim 6, wherein at least one of the closure flaps is configured to be moved into different opening positions by the movement mechanism.

9. The electric vehicle comprising:
    the air inlet device as claimed in claim 1;
    a second air inlet device, the second air inlet device comprising:
        a second cladding portion for guiding the air flow around the electric vehicle, the cladding portion being a second portion of the outer skin or the outer shell of the electric vehicle along which the air flow is configured to flow during movement of the electric vehicle,
        wherein the second cladding portion has:
            a visible third inlet opening configured to let in a third fraction of the air flow into an interior of the vehicle; and
            a concealed fourth inlet opening configured to let in a fourth fraction of the air flow into the interior of the vehicle,
    wherein the air inlet device is arranged on a different side of the electric vehicle than the second air inlet device.

10. The electric vehicle according to claim 9, wherein the air inlet device and the second air inlet device are arranged on different sides of the electric vehicle, symmetrically to one another.

11. The air inlet device according to claim 1, wherein the cladding portion is a region of the electric vehicle at a front section of the vehicle or at a lateral section of the electric vehicle.

12. The air inlet device according to claim 11, wherein the cladding portion is at a region of the electric vehicle that is configured to be impinged longitudinally or transversely by the air flow.

13. The air inlet device according to claim 1, wherein the at least another portion of the outer skin or outer shell that is arranged at least partially in front the concealed second inlet opening comprises a portion of the cladding portion which is at the foremost surface of the electric vehicle in the direction of travel and which is arranged between the visible first inlet opening and a center of the front facie of the vehicle.

14. The air inlet device according to claim 1, wherein the concealed second inlet opening is obscured from the perspective of an observer looking directly at a front of the electric vehicle.

15. A method for controlling an air inlet device for an electric vehicle, the air inlet device comprising: a cladding portion for guiding an air flow around the electric vehicle, the cladding portion being a portion of an outer skin or outer shell of the electric vehicle along which the air flow is configured to flow during movement of the electric vehicle, wherein the cladding portion has: a visible first inlet opening configured to let in a first fraction of the air flow into an interior of the vehicle; and a concealed second inlet opening configured to let in a second fraction of the air flow into the interior of the vehicle, and wherein the visible first inlet opening is at a visible part of the cladding portion which is at a foremost surface of the electric vehicle in a forward direction of travel, and the concealed second inlet opening is at an obscured surface of the electric vehicle having at least another portion of the outer skin or outer shell arranged at least partially in front thereof at the foremost surface of the electric vehicle, the method comprising:

detecting an air requirement of the electric vehicle, varying a closure device of the air inlet device on a basis of the detected air requirement.

\* \* \* \* \*